US008645002B2

United States Patent
Gray et al.

(10) Patent No.: US 8,645,002 B2
(45) Date of Patent: Feb. 4, 2014

(54) SYSTEM AND METHOD FOR FACILITATING AND MONITORING PROVISIONING OF WIRELESS DEVICES

(75) Inventors: Ross Gray, Vancouver (CA); Andrew Mitchell, North Vancouver (CA); Iulian Mocanu, Langley (CA); Riley Hoyt, Fort Langley (CA)

(73) Assignee: NETGEAR, Inc., San Jose, CA (US)

( * ) Notice: Subject to any disclaimer, the term of this patent is extended or adjusted under 35 U.S.C. 154(b) by 1093 days.

(21) Appl. No.: 12/498,022

(22) Filed: Jul. 6, 2009

(65) Prior Publication Data

US 2011/0004549 A1    Jan. 6, 2011

(51) Int. Cl.
*G06Q 40/00*    (2012.01)

(52) U.S. Cl.
USPC ......... 701/1; 455/419; 705/51; 705/2; 705/26

(58) Field of Classification Search
USPC ..................... 705/1, 2, 27, 26, 51; 455/419
See application file for complete search history.

(56) References Cited

U.S. PATENT DOCUMENTS

| | | | |
|---|---|---|---|
| 5,956,636 A | 9/1999 | Lipsit | |
| 6,052,600 A | 4/2000 | Fette et al. | |
| 6,393,408 B1 | 5/2002 | Mosher et al. | |
| 6,622,017 B1 | 9/2003 | Hoffman | |
| 6,628,934 B2 | 9/2003 | Rosenberg et al. | |
| 6,636,489 B1 | 10/2003 | Fingerhut | |
| 6,785,556 B2 | 8/2004 | Souissi | |
| 6,792,271 B1 | 9/2004 | Sherman et al. | |
| 6,871,063 B1 | 3/2005 | Schiffer | |
| 6,934,544 B2 | 8/2005 | Cooper et al. | |
| 6,961,567 B1 | 11/2005 | Kuhn | |
| 6,961,712 B1 * | 11/2005 | Perkowski | 705/26.62 |
| 6,985,931 B2 | 1/2006 | Dowling | |
| 6,996,537 B2 | 2/2006 | Minear et al. | |
| 7,035,595 B1 | 4/2006 | Kim et al. | |
| 7,106,816 B2 | 9/2006 | Filipovic | |
| 7,113,766 B2 | 9/2006 | Horel et al. | |
| 7,319,870 B2 | 1/2008 | Olson et al. | |
| 7,324,816 B2 | 1/2008 | Sherman et al. | |
| 7,363,056 B2 | 4/2008 | Faisy | |
| 7,917,133 B2 * | 3/2011 | Payne et al. | 455/419 |
| 2002/0081992 A1 | 6/2002 | Keller et al. | |
| 2002/0197991 A1 | 12/2002 | Anvekar et al. | |

(Continued)

FOREIGN PATENT DOCUMENTS

| | | |
|---|---|---|
| EP | 1703760 | 9/2006 |
| EP | 2139180 | 12/2009 |

(Continued)

*Primary Examiner* — Harish T. Dass
*Assistant Examiner* — Siegfried E Chencinski
(74) *Attorney, Agent, or Firm* — Boyle Fredrickson, P.C.

(57) ABSTRACT

The present invention provides a system and method for facilitating and monitoring provisioning of wireless communication devices. Wireless devices are provided to an end user in an unconfigured state, capable of being configured for operation using one or more communication protocols. Upon receipt and validation of a provisioning request by the wireless device, for example by a server, the wireless device is securely provisioned for operation with a wireless service provider. Provisioning activities are monitored and information is generated in response to provisioning events, for example via a database. Portions of the information are made available to one or more wireless service providers or parties providing enabling technology of the wireless device. Such reports may be used to facilitate revenue agreements between various parties involved in providing and servicing the wireless device.

38 Claims, 4 Drawing Sheets

(56) References Cited

U.S. PATENT DOCUMENTS

| | | |
|---|---|---|
| 2003/0064723 A1 | 4/2003 | Thakker |
| 2003/0163350 A1* | 8/2003 | Rudowski et al. .............. 705/2 |
| 2004/0210450 A1* | 10/2004 | Atencio et al. ................. 705/1 |
| 2005/0101323 A1 | 5/2005 | De Beer |
| 2006/0063534 A1 | 3/2006 | Kokkonen et al. |
| 2006/0291483 A1 | 12/2006 | Sela |
| 2007/0078924 A1 | 4/2007 | Hassan et al. |
| 2007/0129078 A1 | 6/2007 | De Beer |
| 2007/0156588 A1* | 7/2007 | Howell et al. ................. 705/51 |
| 2008/0020760 A1 | 1/2008 | Elkarat et al. |
| 2008/0081611 A1 | 4/2008 | Hoyt et al. |
| 2008/0188218 A1 | 8/2008 | Sherman et al. |
| 2009/0154675 A1 | 6/2009 | Hanson |
| 2009/0158148 A1 | 6/2009 | Vellanki et al. |
| 2009/0163175 A1 | 6/2009 | Shi et al. |
| 2012/0039323 A1 | 2/2012 | Hirano et al. |

FOREIGN PATENT DOCUMENTS

| | | |
|---|---|---|
| EP | 2161963 | 3/2010 |
| WO | WO 02/13554 | 2/2002 |
| WO | WO 2005/043826 | 5/2005 |
| WO | WO 2009/053918 | 4/2009 |

* cited by examiner

|  | 350 | 360 | 370 |
|---|---|---|---|
|  | Administrator Group | OEM Group | Carrier Group |
| 310 Reporting |  |  |  |
| Monthly Activations | yes (all) | yes (only for devices belonging to the OEM) | yes (only for activations with first connections on the carrier's network) |
| Export to file | yes | yes | yes |
| Device Administration |  |  |  |
| 320 — Device Import | yes (must specify OEM) | yes | no |
| 330 User Administration |  |  |  |
| 332 — Change password | yes | yes | yes |
| 334 Add new users | yes | no | no |
| Delete users | yes | no | no |
| Modify users | yes | no | no |

SYSTEM AND METHOD FOR FACILITATING AND MONITORING PROVISIONING OF WIRELESS DEVICES

FIELD OF THE INVENTION

The present invention pertains in general to support systems for configurable wireless communication devices and in particular to a system and method for facilitating and monitoring provisioning of configurable wireless devices.

BACKGROUND

As wireless communication networks become more ubiquitous, there is an increased demand for wireless-enabled electronic devices such as consumer laptops, palmtops, netbooks, PDAs, cellular telephones, and wireless adapters or embedded or plug-in modules therefor. In any particular time period and/or geographic area, there is typically a plurality of wireless communication protocols available for use. Traditionally, a wireless-enabled device is pre-configured at the time of manufacture to operate using one of these protocols.

However, the pre-configuration approach is subject to several problems. For example, device manufacturers must make different devices compatible with different protocols. This requires different manufacturing, sales, marketing, shipping and other logistical efforts for different customers and/or geographic areas. As a result, there is a fragmentation of the market, which can reduce benefits due to economies of scale and reduce profitability while increasing cost. Furthermore, licensing royalties may be payable at the time of manufacturing, wherein these royalties may be based on the protocols being supported by the device. Such royalty costs can be significant, and may be wasted if the device is never sold or used in a particular licensed mode. This problem exists both for computing devices having embedded wireless capabilities, and external "plug-in" devices such as wireless adapters for conferring wireless capabilities onto a host device.

One approach to the above-mentioned logistical problems is to provide a multi-purpose communication module which can selectively operate using one of a variety of wireless protocols. For example, Qualcomm's Gobi™ chip can provide wireless communication capabilities for both EV-DO and HSPA networks. However, this approach requires pre-configuration of a device capable of operation in plural modes, which increases device cost and complexity. In addition, royalty costs are further increased due to use of plural wireless protocols in such devices. Therefore, this approach does not reduce royalty costs, but may in fact increase them.

Another approach is to provide software-configurable wireless devices which use software modules to configure the device for operation according to a particular protocol. Software defined radios or other software configurable radios are exemplary of this approach. U.S. Pat. No. 6,785,556 discloses a software configurable wireless modem that can be configured using software downloaded by a host computer. However, merely designing a software-configurable device and associated modules does not address logistical issues such as providing a viable organizational model or value chain for providing and supporting such wireless devices in the current marketplace.

United States Patent Application Publication No. 2007/0078924 discloses a software configurable radio that can be configured using software downloaded from a host computer. Configuration may be performed only after determining if digital rights management policies are satisfied.

In addition, U.S. Pat. No. 7,319,870 discloses a method for subscribing to a wireless service through a brokering agent. The brokering agent operates to connect reconfigurable wireless subscriber units to a desired wireless service provider based on subscriber criteria. The brokering agent may also act as a neutral middleman that facilitates the establishment of a subscription relationship between the subscriber unit and a service provider.

U.S. Pat. No. 6,996,537 discloses a system and method for providing downloadable subscription-based software to a wireless device, and for accounting for the use of said software. Accounting information can be used to generate billing data for billing a user of the wireless device.

Furthermore, U.S. Pat. No. 6,052,600 discloses a method for configuring a software programmable radio by a server. Upon a request for programming the radio, the server checks for a valid license or establishes a new license. When a valid license is granted, the server transmits information to the radio for configuration thereof. The server then updates a database to reflect usage data associated with the information received by the radio. At least some of the usage data can be sent to a records computer, such as a billing records computer of a service provider or a subscriber's records computer tracking the total number of uses of a software program.

However, dissemination of information related to device configurations in the above-mentioned references is limited to subscribers and service providers, and possibly neutral third parties such as brokering agents. Moreover, each of the above-mentioned references considers only a portion of the potential stakeholders involved in the wireless marketplace. This represents a limitation to the space of available revenue agreements between stakeholders, since transaction information is not accessible to some stakeholders such as device manufacturers and third party licensors. Therefore there is a need for a method and system for provisioning and tracking provisioning of a wireless communication device that overcomes one or more of the problems in the art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for facilitating and monitoring provisioning of wireless devices. In accordance with an aspect of the present invention, there is provided a system for facilitating and monitoring provisioning of configurable wireless devices, the system comprising: a provisioning module configured to receive a provisioning request for a wireless device, the provisioning module configured to facilitate a provisioning of the wireless device for operation with a wireless service provider in response to the provisioning request; a monitoring module configured to generate information in response to said provisioning, said information including an indication of the identity of a party providing enabling technology of the wireless device; and a reporting module configured to make available at least a first portion of said information generated by the monitoring module to the party providing enabling technology of the wireless device.

In accordance with another aspect of the present invention, there is provided a method for facilitating and monitoring provisioning of configurable wireless devices, the method comprising: receiving a provisioning request for a wireless device; facilitating a provisioning of the wireless device for operation with a wireless service provider in response to the provisioning request; generating information in response to said provisioning, said information including an indication of identity of a party providing enabling technology of the wireless device; and making available at least a first portion of said generated information to the party providing enabling technology of the wireless device.

BRIEF DESCRIPTION OF THE FIGURES

These and other features of the invention will become more apparent in the following detailed description in which reference is made to the appended drawings.

DETAILED DESCRIPTION OF THE INVENTION

Definitions

The term "provisioning" refers to activities related to configuring and/or authorizing a wireless device for operation with a particular wireless service provider, type of wireless service provider, or group of wireless service providers. Provisioning may include activities such as programming a configurable wireless communication module to operate using one or more predetermined protocols, authorizing the wireless device to operate in the network, configuring user accounts, assigning network resources, and the like.

The term "unique idenfier" refers to a pre-configured identifier such as a serial number or binary or hexadecimal code which can be used to substantially differentiate a particular wireless device from other similar wireless devices. Unique identifiers may be configured at the time of device manufacture or optionally at a later stage, provided measures are in place to ensure the unique identifier functions for its intended purpose.

The term "revenue" refers to a one-time or series of monetary payments, exchange of considerations, exchange related to licensing or cross-licensing terms, barter exchange, or other exchange of goods, services or value.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a system for facilitating and monitoring provisioning of configurable wireless devices. The system comprises a provisioning module, such as a computer server or collection of servers, configured to receive a provisioning request for a wireless device. For example, provisioning requests can be routed to the provisioning module via one or a combination of wired and wireless network links. The provisioning module is configured to facilitate a provisioning of the wireless device for operation with a wireless service provider in response to the provisioning request. Such provisioning may include configuring the wireless device to operate according to a predetermined set of wireless protocols by providing programming instructions for configuring components of the wireless device.

The system of the present invention further comprises a monitoring module configured to generate information in response to said provisioning. For example, the monitoring module may comprise a computer or collection of computers coupled to the provisioning module and monitoring and/or recording the activities thereof. The information generated by the monitoring module includes an indication of the identity of a party providing enabling technology of the wireless device. The system further comprises a reporting module, for example an access server or other computerized reporting device, configured to make available at least a first portion of said information generated by the monitoring module to the party providing enabling technology of the wireless device. The party providing enabling technology may be, for example, a manufacturer involved in making the wireless device, a licensor licensing technology used in operation of the provisioned wireless device and/or the like.

The present invention further provides a method for facilitating and monitoring provisioning of configurable wireless devices. The method comprises receiving a provisioning request for a wireless device. The method further comprises facilitating a provisioning of the wireless device for operation with a wireless service provider in response to the provisioning request. The method further comprises generating information in response to said provisioning, wherein the information includes an indication of identity of a party providing enabling technology of the wireless device. The method also includes making available at least a first portion of said generated information to the party providing enabling technology of the wireless device.

Embodiments of the present invention are directed toward secure provisioning of wireless devices such as wireless modems or adapters, which are manufactured lacking key communication capabilities. Provisioning of a wireless device enables that wireless device to communicate using a particular set of wireless protocols. Provisioning activities may be tracked by parties such as wireless service providers providing the network for which the wireless device has been provisioned, device manufacturers, licensors of technology incorporated in the wireless device, licensors of technology which is incorporated in the wireless device during provisioning, or other parties providing enabling technology of the provisioned or unprovisioned wireless device. Licensors may be licensors of technology which is incorporated into the wireless device prior to provisioning or technology which is incorporated into the wireless device during or due to provisioning. The present invention may be used to defer the process of configuring the wireless device, thereby deferring the requirement to pay royalties to licensors, for example.

In embodiments of the invention, one or more parties providing enabling technology, and/or other parties such as the wireless service provider can access, via the reporting module, information generated by the monitoring module. In embodiments of the invention, such access can be used to facilitate revenue agreements between parties.

In embodiments of the invention, the wireless device transmits a unique identifier to the provisioning module as part of the provisioning request or during the provisioning process. The provisioning module may use this unique identifier to validate the provisioning process. Furthermore, the monitoring module or reporting module may generate some of its information based at least in part on the unique identifier of the wireless device, for example in order to identify one or more parties providing enabling technology of the wireless device.

In embodiments of the invention, parties receiving information generated by the reporting module may react to said information in one or more ways. For example, received information may be used to facilitate a revenue agreement between parties. As another example, a party may, upon or after receiving information via the reporting module, communicate with the wireless device directly or indirectly through the provisioning module, for example. The communication may be used to facilitate further provisioning, authorization, promotional messaging, or the like.

Figure 1:
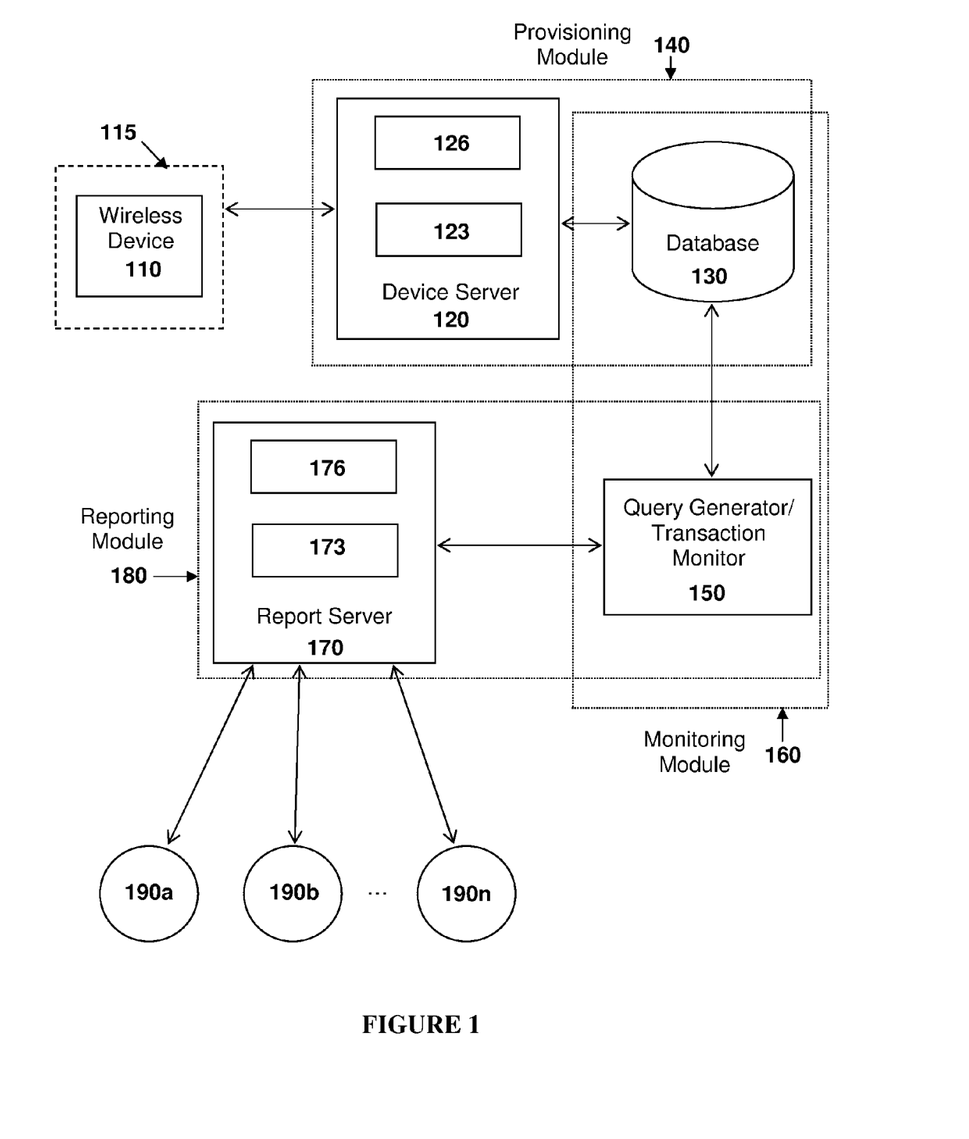
FIG. 1 illustrates a system for facilitating and monitoring provisioning of configurable wireless devices in accordance with embodiments of the invention.

FIG. 1 illustrates a system for facilitating and monitoring provisioning of configurable wireless devices in accordance with an embodiment of the invention. A connection is made to a provisioning module 140 to request a provisioning of a configurable wireless device 110. The connection may be initiated by the configurable wireless device 110 or by associated software, for example operating on an optional host device 115. The host device 115 may be a computer or other electronic device which is coupled to the wireless device 110 via a wired or wireless external interface or which contains the wireless device 110 embedded therein. The connection to the provisioning module 140 may be made using an existing communication medium, for example a wired or wireless network connection provided by the optional host device 115.

The provisioning module 140 interfaces with the configurable wireless device 110 or host device 115 to facilitate provisioning of the wireless device for operation, provided authentication and authorization criteria are satisfied. This interface may be facilitated for example using a device server 120 such as an internet server. The wireless device 110 or representative software thereof is configured to address and connect with the device server 120 to initiate the provisioning process. A request is made on behalf of the wireless device to provision it for a particular mode of operation. The device server 120 may contain an authentication and authorization module 123, which receives information transmitted by the wireless device 110, including a unique identifier thereof. The authentication and authorization module 123 may validate the information or request by accessing a database 130 of the provisioning module 140. For example, unique identifiers of configurable wireless devices may be uploaded to the database 130 prior to sale, and authentication may include determining whether the unique identifier transmitted by the wireless device 110 matches one of the unique identifiers previously uploaded to the database 130. Authorization may include looking up other information in the database, which is associated with the unique identifier, and indicative of whether the requested provisioning operations are authorized by an administrator or administrative program. For example, devices from manufacturer A may only be authorized to be provisioned to operate using communication protocol C, whereas devices from manufacturer B may be authorized to be provisioned to operate using protocols C or D, or both.

In some embodiments, authentication and/or authorization involves communication with one or more parties which are providing and/or enabling the wireless device, for example via the reporting module. For example, the unique identifier may be communicated via the reporting module to a party providing the wireless device. This party may then determine whether the unique identifier is authenticated and/or authorized for the requested provisioning by querying a database. In one embodiment, such provider-mediated authentication and/or authorization may be required before wireless device provisioning occurs. In some embodiments, temporary device provisioning may be allowed without such provider-mediated authentication and/or authorization. However, provider-mediated authentication and/or authorization may be required at a later time, for example before a predetermined expiry of the temporary device provisioning. If the provider-mediated authentication and/or authorization is not provided before said expiry, the wireless device may be configured to lock or delete information acquired during wireless device provisioning.

If the authentication and authorization module 123 indicates that the requested provisioning is authorized and the wireless device 110 is authenticated, then provisioning is performed by the provisioning module 140. The provisioning module 140 prepares a configuration program file based for example on the type of wireless device 110 and the mode or modes of operation requested and authorized. The configuration program file may then be uploaded to the wireless device 110 and instructions contained therein executed to provide the requested and authorized provisioning. The configuration program file may further be encoded or restricted such that it may only be used for configuration of the particular wireless device 110. Provisioning operations may be facilitated by a configuration module 126 within the device server 120, which may facilitate preparation and uploading of the configuration program file to the configurable wireless device 110.

A monitoring module 160 is provided to generate information in response to provisioning activities. For example, provisioning activities can be recorded in the database 130 of the provisioning module 140, which can also be a database associated with the monitoring module 160. A query generator 150 may then be used to query the database 130 as needed to determine information indicative of provisioning activities recorded in the database 130. For example, query generator 150 can query the database 130 to determine the number of provisioning activities carried out since the last query. Queries may be further configured to differentiate provisioning activities based on the identity of the wireless service providers or configurations for which wireless devices have been provisioned, as well as the identity of wireless device manufacturers and other parties providing enabling technologies of the wireless device. Alternatively, a transaction monitor 150 can be used to monitor and in some instances record provisioning activities as they occur. The transaction monitor may also differentiate provisioning activities based on identity of parties involved.

A reporting module 180 is provided to make available information generated by the monitoring module to parties providing service to the wireless devices, parties providing enabling technologies of the wireless device, or both. These parties are depicted generally as a collection of parties 190a, 190b through to 190n. The reporting module 180 may generate reports either periodically or upon request, for example via email, web-based system or other means as would be readily understood. Reports to each party 190a to 190n can be constrained such that only information authorized to be provided to a given party may be contained in a report to that party.

The reporting module 180 may comprise a report server 170 and the query generator or transaction monitor 150. Requests may be received and validated by a request receipt module 173. The request receipt module 173 may, for example, validate requests using a log-in and password system. The reporting module 180 is configured to generate report files using a report file generator module 176 and transmit said report files to the appropriate party or parties from the collection of parties 190*a* through to 190*n* using the report server 170. Report information can be built by running queries on the database 130 using the query generator 150 or by otherwise obtaining information from the transaction monitor 150 if present.

Figure 2:
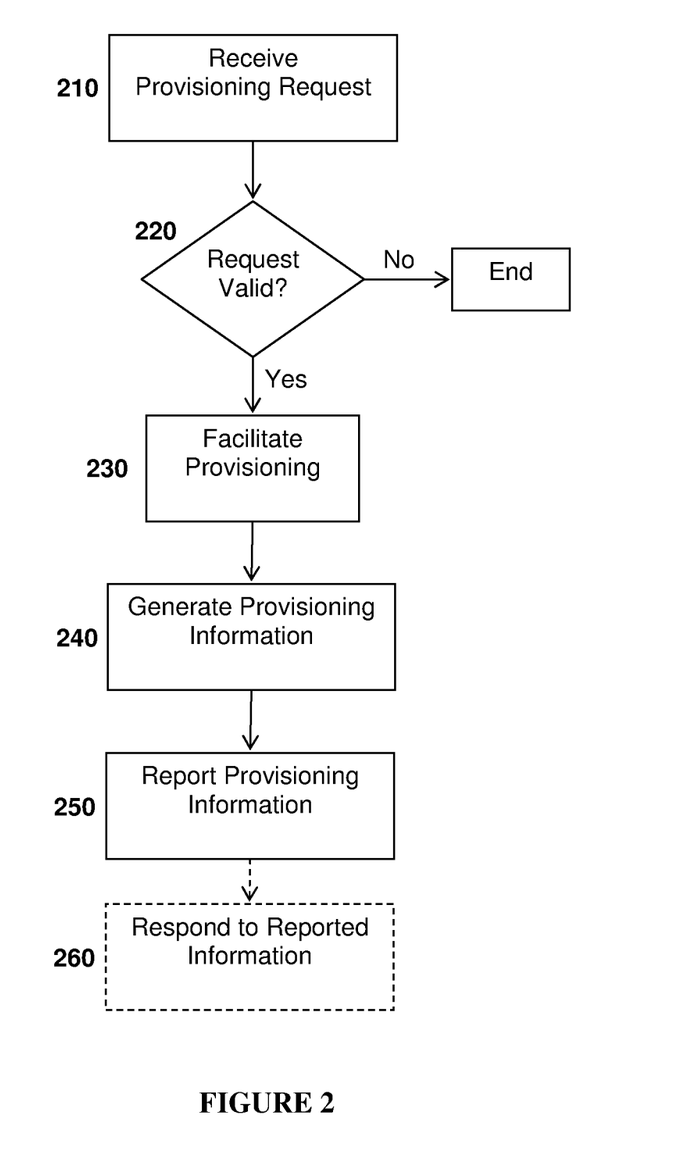
FIG. 2 illustrates a method for facilitating and monitoring provisioning of configurable wireless devices in accordance with embodiments of the invention.

FIG. 2 illustrates a method for facilitating and monitoring provisioning of configurable wireless devices in accordance with an embodiment of the invention. In step 210, a provisioning request is received for provisioning a configurable wireless device. The provisioning request may be initiated by the configurable wireless device or by associated software running on the wireless device or on a host system for the wireless device, for example. The request may contain specific information, such as information uniquely identifying the wireless device and identifying the type of wireless device. In step 220, the request is examined to determine if it is valid, for example by a process of authentication and authorization. Authentication and authorization may involve receiving a unique identifier of the wireless device and determining if this unique identifier appears in a list of pre-authenticated identifiers, which are further pre-authorized for the requested provisioning. The list may be contained in a database, for example.

Authentication and authorization may be performed within the provisioning module. Authentication and authorization may also be performed by one or more parties providing enabling technology of the wireless device, for example by communicating the unique identifier to said parties via the reporting module and receiving a response therefrom.

If the request is deemed valid, the provisioning is facilitated in step 230. This step involves providing information for provisioning the wireless device, such as a set of instructions, which can be used to provision or configure the wireless device for a desired mode of operation. The information may be provided in the form of a digital configuration file which is constrained such that it is only operable to configure a wireless device having the unique identifier of the requesting configurable wireless device. The wireless device or associated agent may then execute the instructions to provision the wireless device.

In step 240, information is generated in response to the provisioning facilitated in step 230. The information includes an indication of identity of a party providing enabling technology of the wireless device, for example a manufacturer or technology licensor. This indication of identity may be based on data received from the wireless device as part of the provisioning request, for example a manufacturer identification number or even a wireless device unique identifier. The information may be stored for use in the next step 250. Other information generated may include a date of provisioning, type of configuration performed or protocols for which the wireless device is configured, the wireless service provider network for which the wireless device is configured, and the like.

In step 250, at least a portion of the information generated in step 240 is made available as a report to parties including one or more parties providing enabling technology of the wireless device. Different portions of information may be made available to different parties, for example to prevent undesired access of information by competing organizations. The information may be used to facilitate revenue agreements between parties such as parties providing enabling technologies, wireless service providers, or a combination thereof.

In some embodiments, the parties receiving report information may respond to said information in optional step 260. For example, transactions in accordance with a revenue agreement between parties may be triggered due to receipt of said information. As another example, a party may, upon or after receiving information via the reporting module, communicate with the wireless device directly or indirectly through the provisioning module, for example. The communication may be used to facilitate further provisioning, authorization, promotional messaging, or the like.

Device Provisioning

Embodiments of the present invention are directed in part toward provisioning a configurable wireless device such as a radio transceiver, cellular handset, wireless modem adapter for use with a computer or other device, wireless modem built into a computer or other device, and/or the like. Wireless device provisioning may be facilitated by a client-server interaction, for example wherein the configurable wireless device connects to a remote server and requests and receives provisioning instructions therefrom via a pre-existing communication link. In embodiments of the present invention, a provisioning module, such as a computer server, computer configured by a computer program, or a set of programmed functionalities, can be provided to facilitate provisioning activities. In embodiments of the present invention, wireless device provisioning may be facilitated by a host device to which the configurable wireless device is coupled, wherein the host device is configured in accordance with the present invention, for example via software.

In some embodiments, the wireless device is equipped with one or more general-purpose electronic components which can be, but may not initially be, configured to facilitate wireless device operation using one or more potential wireless protocols. For example, this may allow the wireless device manufacturer to provide wireless devices at a reduced cost, since royalties to protocol licensors may not need to be paid at the time of manufacture. Furthermore, deferring royalty payments may reduce costs by avoiding paying royalties by a party if a wireless device remains unsold or unactivated. These types of cost reductions may facilitate ease of distribution of wireless devices, hence increasing the potential adoption rate of such wireless devices by means of availability. Positive feedback in the marketplace may potentially further increase the adoption rate of such wireless devices. Other benefits, such as logistical benefits, reduction in negotiation and licensing overheads, and the like, may also exist for one or more entities in the supply or value chain associated with a wireless device configured to be provisioned according to embodiments of the present invention.

In accordance with embodiments of the present invention, wireless devices may be provided with configurable general-purpose digital and/or analog electronic components. For example, general-purpose digital components such as microprocessors, microcontrollers, digital signal processors, digital filters, and/or the like may be provided as collections of one or more integrated circuits such as field-programmable gate arrays (FPGAs), other programmable logic devices (PLDs), general-purpose microprocessor integrated circuits, configurable RAM or ROM memories, and/or the like. General-purpose, configurable analog components may also be provided, including configurable radio-frequency (RF) front-ends, transmission lines, amplifiers, analog filters, and general-purpose or configurable antennas. It is envisioned that RF front-ends and amplifiers and other traditionally analog components may also be provided using configurable, general-purpose digital equivalents. Configurable, general-purpose analog-to-digital converters or digital-to-analog converters may also be provided in accordance with embodiments of the present invention, for example by configuring sampling rates or schedules, or output switching rates or schedules. Pre-configured devices may also be provided along with the configurable general-purpose devices to facilitate functionality of a wireless device.

In one embodiment, configuration of general-purpose components primarily comprises configuration of general-purpose digital components, for example using instructions residing in software to perform configuration operations, such as configuring an FPGA, providing signal processor or microprocessor algorithms or settings, and/or the like. In a further embodiment, configuration of general-purpose analog components may also be performed. Analog configuration may involve selection of analog components from one or more banks of analog component modules, for example via setting of an RF or other switch. Analog configuration may also or alternatively involve configuration of the analog components themselves. For example, an RF amplifier or filter comprising an electronic circuit may be configured by switching ON or OFF desired portions of the circuit, for example using transistor switches. As another example, electromagnetic components such as RF transmission lines and antennas may be configured using microelectromechanical system (MEMS) switches or other configuration means.

In one embodiment, a wireless device may initially be provided in a substantially completely unconfigured digital state, such that no software code or other source of configuration information is provided initially for configuration of a part of the general-purpose digital components of the wireless device.

In another embodiment, predetermined portions of the wireless device may be partially pre-configured. For example, all or portions of some components, such as microprocessors, microcontrollers, and/or digital signal processors, or other supporting hardware, may be partially pre-configured, such that these components are configured to perform some functions associated with one or more predetermined wireless protocols but not other functions. For example, functions excluded from such pre-configuration can be selected such that one or more predetermined portions of wireless protocols requiring licenses are not enabled. In this case, some wireless device providers, such as manufacturers, can defer or avoid paying one or more licensing royalties, although payment of such royalties may be required by another party upon later configuration. This process may allow refined control over royalty costs. By pre-configuring portions of the wireless device, advantages of the present invention can be realized while also reducing time and complexity involved when provisioning the wireless device.

In yet another embodiment, uninstalled software is provided along with the wireless device, the uninstalled software containing instructions which, when executed, result in partial configuration of one or more of the general-purpose digital components. By providing uninstalled software with the device, provisioning can be simplified since the amount of software code that must be downloaded from a server is reduced. Downloaded software can further be combined with the software provided with the wireless device to perform a single, integrated installation process to configure the wireless device. This may be advantageous in reducing complexity of the installation process, while also enabling more effective integration of pre-provided and downloaded software components. In a further embodiment, installation of software may automatically trigger a connection to the provisioning module to report a configuration.

Based on the above, it is to be understood that various embodiments of the present invention provide for wireless devices supplied, for example by the manufacturer, distributor, or other party, having various degrees of pre-configuration. Selection of the structures and/or functions of the wireless device which are pre-configured and those which are unconfigured when the wireless device is provided can be based on a combination of economic and logistical considerations. For example, it may be preferable to leave certain aspects of a wireless device unconfigured in order to defer paying licensing royalties, but this may be balanced with considerations such as cost and complexity of deferring configuration of said aspects.

In some embodiments, provisioning or configuration of a wireless device involves downloading and executing software code. The downloaded software code contains instructions which, when executed, result in configuration of one or more general-purpose digital or analog components of the wireless device. Once configured, the wireless device is capable of operation for communication using one or more protocols. In embodiments of the present invention, the software code is digitally signed and configured to be operable only with the specific wireless device to which it is downloaded. This may prevent unauthorized redistribution of a configuration file.

In some embodiments, some functionality of the wireless device may be provided with the wireless device in an initially inaccessible format. For example, the wireless device may include special-purpose or pre-configured general-purpose hardware components which are locked or otherwise inaccessible until an access code is provided, or other unlocking criteria are satisfied. Locking mechanisms may be provided in hardware, software, firmware, or a combination thereof. As another example, the wireless device may be provided along with locked, scrambled or encrypted software which, when unlocked, unscrambled or decrypted, may be executed to result in configuration of one or more general-purpose digital or analog components of the wireless device. In some jurisdictions, or under some licensing agreements, such embodiments, if sufficiently secure from unauthorized access, may be deemed to be sufficiently inaccessible that licensors cannot, or may choose not to, demand royalties for proprietary protocols or configurations potentially contained within the wireless device but rendered inaccessible.

In some embodiments, provisioning involves device identification. For example, a wireless device may be pre-configured with a substantially unique identifier and/or other information which can be used to identify features of the wireless device such as its model number, manufacturer, serial number, supplier, or other associated information. As another example, a wireless device may be previously associated with a user through a registration process, and provisioning can involve obtaining a unique identifier from the user, such as a username and password, or credit card number. As yet another example, the identification process may be performed during provisioning.

In some embodiments, the wireless device is configured to identify itself differently depending on its provisioning history. For example, a previously unprovisioned or unactivated wireless device may transmit a code during provisioning which identifies it as such, while a device which is currently provisioned for use on at least one type of wireless network may transmit a different code identifying it as such, the code possibly further depending on a current configuration. Basing identification on provisioning history may affect how a wireless device is provisioned, and may facilitate provisioning monitoring and tracking operations.

In some embodiments, wireless device identification may be associated with authentication, authorization, or both. Authentication may be performed using the unique identifier associated with the wireless device or wireless device user, to ensure that the identifier is likely of valid origin. For example, the unique identifier may be recorded and stored in a provisioning database at the time of its assignment. The provisioning database may then be accessed during the provisioning process to authenticate the unique identifier and determine which operations are authorized for that wireless device. Authorization may be performed to determine what configuration information, such as downloadable software code or passwords, are authorized to be provided to the wireless device, if any. Furthermore, each identification, authentication, and authorization procedure may be recorded in the provisioning database for administration purposes, such as tracking usage of a unique identifier and limiting authorizations in the case of repeatedly used identifiers.

In some embodiments, authentication and authorization may be performed by one or more parties providing enabling technology of the wireless device, for example by communicating the unique identifier to said parties via the reporting module and receiving a response therefrom. For example, full provisioning of the wireless device may require an authorization message to be communicated from a party providing enabling technology of the wireless device. The reporting module may communicate the unique identifier to said party, which then determines whether to issue an authorization message. In some embodiments, the authorization message may be required before provisioning occurs. In some embodiments, temporary or partial provisioning may be allowed without the authorization message, although permanent or full provisioning requires the authorization message. The authorization message may be sent directly to the wireless device or to the provisioning module.

In some embodiments, wireless device provisioning involves the wireless device connecting with a remote server, as described above. As also described above, the wireless device may not yet be configured for at least one type of wireless communication prior to provisioning. Therefore, in such embodiments, there is provided an alternate communication link between the wireless device and server, at least initially, to facilitate wireless device provisioning. For example, in provisioning a wireless adapter for a personal computer such as a laptop, the laptop may provide an alternate communication link, for example via wired or wireless Ethernet and an associated internet connection, the alternate communication link being used to facilitate the client-server provisioning process. In a further embodiment, where the alternate communication link includes a firewall, means to traverse the firewall, such as a proxy tool, may be provided. Provisioning may be performed by interaction between local provisioning software for the wireless device and server using the alternate communication link, thereby provisioning the wireless device to operate using a protocol such as Wi-MAX, EV-DO, HSPA, and/or other wireless networking protocols such as pertaining to cellular, WLAN, WWAN, or the like.

Monitoring Provisioning

The present invention provides for monitoring of the wireless device provisioning process by generating information in response to wireless device provisioning events. Such information can include an indication of the identity of one or more parties providing enabling technology of the wireless device, for example manufacturers, distributors, technology licensors, or a combination thereof. In embodiments of the present invention, a monitoring module such as a computer configured by a software program or a computing module having a set of programmed functionalities such as database queries, may be provided to facilitate provisioning monitoring activities.

In one embodiment, monitoring of wireless device provisioning involves monitoring transactions between a provisioning server and a provisioning database, both of which operate in accordance with the provisioning module comprising appropriately configured computing hardware, software, firmware, or a combination thereof. Monitoring may involve periodic querying of the provisioning database or real-time reporting of provisioning events, for example triggered by communication between server and database. Alternatively, monitoring may involve querying of the provisioning database upon receipt of a request from the reporting module. Some or all of the information recorded in the database due to a provisioning event may be accessed during monitoring.

In one embodiment, the monitoring module may comprise a predefined set of executable database queries incorporated into the provisioning database of the provisioning module, along with an appropriately configured computer module to facilitate execution of such queries. The provisioning database may further be considered as part of the monitoring module, since it records and stores provisioning information used for monitoring.

In some embodiments, during a provisioning event of a wireless device, one or more database records may be updated in the provisioning database, and monitoring provisioning involves monitoring information and updates in such database records. A database record within the database may correspond to a unique identifier of the wireless device being provisioned, such as a device serial number or chip ID. It is also envisioned that a database record representing multiple wireless devices may be monitored and updated, for example a record corresponding to a manufacturer identification label or licensor identification label. In either case, the database record will contain information indicative that a wireless device has been provisioned, along with information indicative of at least one provider of enabling technology of the wireless device. In some embodiments, further information in the database record, such as the date of the wireless device provisioning, identifier indicative of what kind of provisioning was performed, and the like, may also be written or updated during wireless device provisioning. Monitoring may comprise counting the number of provisioning events by type, for example.

Monitoring of wireless device provisioning via database records may be facilitated by querying the provisioning database or monitoring transactions therewith to obtain relevant information. For example, the cumulative number of wireless devices provisioned by date and associated with a given set of wireless service providers and providers of enabling technology may be returned by a monitoring query. This information may be provided to the reporting module, or stored in a separate file or database record. In some embodiments, the monitoring module provides information upon request, and in a standardized or requested format. This may be accomplished by providing a standard set of database queries for use by the monitoring module.

Reporting Provisioning

The present invention provides for reporting of wireless device provisioning events, either individually or in aggregate, by making available to external parties at least a portion of the information provided by the monitoring module. Such information may be made available to one or more parties such as wireless service providers and parties providing enabling technology of the wireless device. In embodiments of the present invention, a reporting module such as a computer or server configured by a software program or a computing module having a set of programmed functionalities, may be provided to facilitate reporting activities.

In one embodiment, wireless device provisioning information, accessible via provisioning monitoring, is made available by a network-based reporting process to pre-authorized parties. For example, reporting can be provided via a secure web server, periodic email reports, FTP, or other networked means of disseminating information. Reporting may be automated or user-initiated.

In some embodiments, the present invention provides for a reporting module comprising a networked server operatively coupled to the provisioning database and capable or running queries thereon, for example as provided by the monitoring module. In one embodiment, pre-authorized users from involved parties or organizations, such as wireless service providers and parties providing enabling technology of the wireless device, can securely log in to the reporting module server and obtain desired information subject to authorization. For example, information may be obtained by running database queries directed toward wireless device provisioning statistics, information on royalties payable, provisioning trends, revenue information, and/or the like. In one embodiment, reports are automatically generated, for example via automatically scheduled database queries, and transmitted to pre-authorized parties at predetermined times, for example via email. These reports can be generated and sent periodically to facilitate billing, for example.

In some embodiments, reportable information may be restricted based on the identity of the party for which the report is generated. For example, when competing wireless service providers or competing manufacturers use the same database, information may be restricted such that information relevant to one competitor is inaccessible to another. In some embodiments, some aggregate information may be made available to parties, for example information regarding industry-wide trends.

In some embodiments, information regarding wireless device provisioning events is reportable to device manufacturers such as OEMs. Reports including such information can be used by the manufacturers to facilitate determining where or with which service providers the manufactured wireless devices are being used. Such information may be useful for example in contract negotiations, billing, licensing, and for general understanding of programming and activation trends. In further embodiments, the first provisioning event of a wireless device, or the first provisioning event of a wireless device for use with a new service provider, is differentiated from subsequent provisioning events. This enables information to be filtered appropriately if initial provisioning events are of greater interest.

In some embodiments, periodic reports can be generated or accessed by selected parties providing enabling technologies, for example via a reporting module, to show which wireless devices have been programmed and used on which wireless networks. These reports may be used as the basis for invoicing of the wireless carriers or service providers. In further embodiments, once a report is generated for a wireless device for billing purposes, the database record can be updated to indicate that a billing event has been initiated for a wireless device provisioning activity. This may be used to ensure that wireless device provisionings are not billed multiple times.

In some embodiments, reports can be generated or accessed by selected parties to assist organizations in paying royalties to enabling technology licensors in a timely fashion. For example, reports may be provided to licensors, licensees, or both, including information on provisioning events of wireless devices for which a licensing royalty is payable. Such information may include the number of relevant provisioning events during a given time interval. Reports may be tailored to provide information in a manner that is relevant to existing licensing agreements between one or more licensors and one or more licensees.

In some embodiments, reports can be generated or accessed by wireless service providers or telecommunications carriers. For example, reports may be used to generate information on royalties or subsidies payable by the wireless service providers in accordance with one or more revenue agreements in place. Reports may also be used to generate information regarding wireless device user accounts, such as customer billing information, wireless device activation history, charges related to wireless device activation, wireless device usage history, billable extra features, contact information, network management information, and/or the like.

In some embodiments, reports can be generated or accessed by administrators who may have relatively unrestricted access to database information. For example, administrators may be authorized to compare information related to different providers of enabling technologies of the wireless devices and different wireless service providers. This may enable such administrators to generate information relevant to several parties or organizations at once.

In some embodiments, reporting can account for wireless device defects or faults and product returns by avoiding generating duplicate records for replacement wireless devices. In some embodiments, provisioning events for replacement wireless devices may still be counted for the purpose of generating royalty payments between licensors and licensees.

Figure 3:
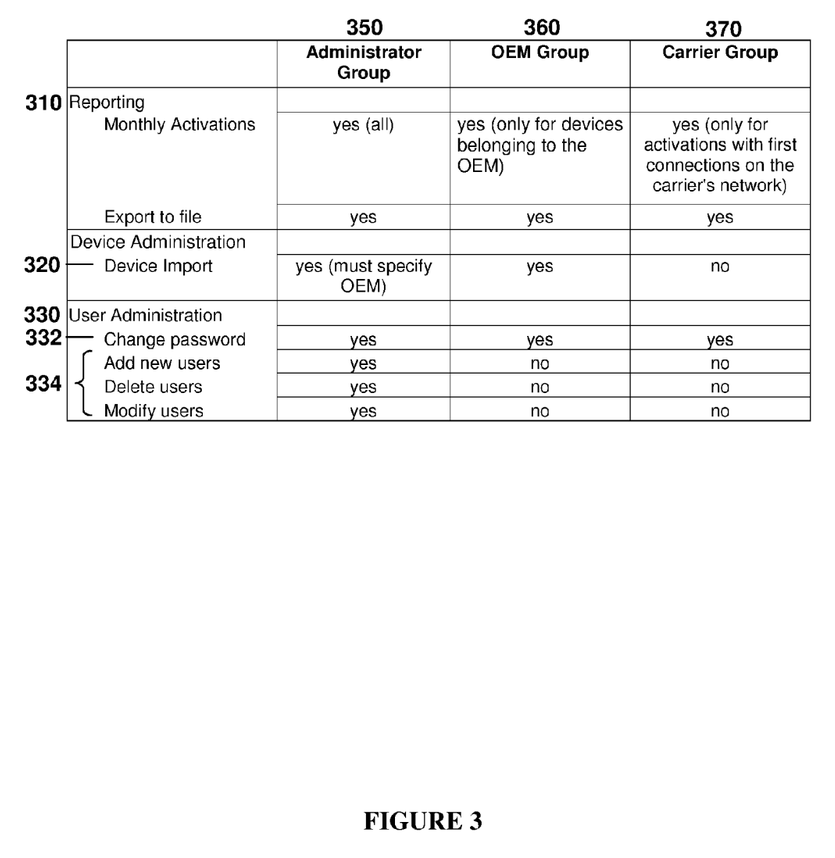
FIG. 3 illustrates a table specifying differentiated privileges for accessing or uploading information from or to a database, in accordance with an embodiment of the invention.

FIG. 3 illustrates a table specifying differentiated privileges for accessing or uploading different types of information by different parties via a server-based reporting module, in accordance with an embodiment of the present invention. Each party can access different types of information based on their predetermined privileges, which may be specified by an authorization profile for each party. Accessible information includes access to reports of the number and nature of activations by month 310, either on-screen or exported to a comma separated value file format. Uploadable information includes the capability, by device manufacturers (OEMs), to import device-specific information into the database 320 for later authorization, authentication and provisioning reporting. In addition, administrative access 330 may be granted to change database access passwords 332, and add, delete or modify users or user profiles 334. Passwords are used to moderate access to the server-based reporting module.

In some embodiments, the reporting module may be configured to communicate with parties providing enabling technology as part of the wireless device provisioning. For example a wireless device unique identifier may be communicated to one or more parties via the reporting module for authentication or authorization purposes. The parties may then perform authentication or authorization activities and respond by communicating with the wireless device or provisioning module, for example via the monitoring module and/or reporting module. This communication may be used to grant or deny all or part of the requested wireless device provisioning, or to make a temporary provisioning permanent, or to periodically renew a temporary provisioning, for example in accordance with a predetermined subscription.

In some embodiments, the parties may respond to information reported by the reporting module in other ways which involve the wireless device. For example, a welcome message, promotional communications, configuration updates or upgrades, or other communications may be initiated by a party in response to a received report. Such communications may be routed through the reporting and/or provisioning modules or servers thereof, or they may be routed through other communication channels, for example via the communication network for which the wireless device has been provisioned.

FIG. 3 further illustrates three different groups of parties 350, 360, and 370, and the general type of access to reporting information that each group is granted. Parties in the administrator group 350 can access all reporting information 310, and can import wireless device-specific information into the database 320. Parties in the administrator group 350 can further add, delete, modify and configure users or parties belonging to their own or other groups 334. Parties in the OEM or manufacturer's group 360 can access reporting information 310 only for wireless devices manufactured by that party. Parties in the OEM or manufacturer's group 360 can further upload or import wireless device-specific information into the database 320. Parties in the carrier or wireless service provider group 370 can access reporting information 310 only for first activation or provisioning events which provision wireless devices for use with the network serviced by that party. All parties can also change their own passwords 332.

Facilitating Revenue Agreements

The wireless industry in many cases is comprised of a plurality of substantially separate parties or business organizations working together to provide an end product. For example, research institutions, research and development departments of larger organizations, design organizations, "fabless" organizations, systems integrators, universities, and the like, may separately or jointly develop communication technology such as communication protocols, implementation techniques for communication protocols, user interface technology, and numerous other technologies or techniques that may potentially be integrated into a wireless device. Such organizations may license their technology, for example through patents, to other organizations. Furthermore, patents may be held and licensed by third party organizations. One or more manufacturing organizations, such as chip manufacturers, subassembly manufacturers, original design manufacturers (ODMs), original equipment manufacturers (OEMs), and product assemblers, may each manufacture one or several components of a wireless device autonomously or under contract with another organization. Other intermediate organizations, such as value added resellers, may package, distribute, brand or market the wireless devices. In addition, wireless service providers supply networks for use by the wireless devices, and may also package, distribute, brand or market wireless devices.

The relationship between organizations in the wireless industry is dynamic and complex, and the above description is not intended to be exhaustive or even necessarily representative of the current organizational landscape. However, based on the above it is clear that a complex network of interactions may exist between organizations in the industry.

For example, one practice is for a wireless service provider to provide revenue, such as a subsidy or royalty payment, to a wireless device supplier or manufacturer once a wireless device is provisioned for use with the wireless service provider's network. For example, such an arrangement may be used to subsidize the cost of wireless devices in order to encourage consumers to enter into a service arrangement with the provider.

By providing an independently administered, neutral system and method for facilitating and monitoring provisioning of wireless devices, embodiments of the present invention can facilitate such revenue agreements between wireless service providers and parties providing enabling technology of the wireless device, such as wireless device suppliers or manufacturers, or technology licensors. For example, using an independent administrator instead of relying on the service providers to inform manufacturers of wireless device activations removes a potential conflict of interest problem by the service providers, who may be required to pay manufacturers upon wireless device activation as per a revenue agreement. In addition, the independently administered system may be configured to allow wireless device suppliers or manufacturers to generate their own reports of wireless device activations or related activities so that they can proactively bill service providers, and study activation trends.

Additionally, embodiments of the present invention provide an integrated approach to provisioning, monitoring and reporting by an independent intermediate agreement provider. Having such an agreement provider being independent from the wireless service providers and parties providing enabling technology may reduce the incentive to misreport or delay reporting of provisioning activities in order to benefit one party at the expense of another. Furthermore, utilizing an independent agreement provider may reduce the perception that such misreporting or delayed reporting is even possible. Increasing trust in the reporting process can reduce the perception of risk, which can increase efficiency or effectiveness of revenue agreements between parties, for example.

Embodiments of the present invention may also be utilized to facilitate revenue agreements between plural parties providing enabling technology of the wireless device, such as between wireless device suppliers or manufacturers and technology licensors. In some cases, licensing costs may amount to a significant portion of the overall costs of providing a wireless device, due to proprietary technology embodied within the wireless device. Instead of paying for licenses up front, for example at the time of manufacture, and attempting to recover the costs from wireless service providers or end users, it is attractive to wireless device suppliers or manufacturers to be able to defer licensing royalties, either by delaying payment or by passing the payment obligation to another organization or individual. Delaying royalty payments until provisioning has the additional effect of eliminating royalties for wireless device units which are unsold or remain unprovisioned regarding some subset of proprietary technologies for which royalties would otherwise be payable.

For example, in embodiments of the present invention, a party providing enabling hardware technology of the wireless device may leave one or more hardware components substantially unconfigured, such that key technology components requiring a license are left unprovided by that party. The party providing hardware technology therefore need not take a license to those key technology components, thereby saving itself costs, negotiation efforts, administration efforts, or other logistical efforts. The licensor of the key technology components can use reports provided according to the present invention to collect licensing revenue from an appropriate party at the time of activation. For example, the licensor can collect from the end user or wireless service provider, or other party such as an escrow agency acting as an intermediary between licensor and payee.

The invention will now be described with reference to specific examples. It will be understood that the following examples are intended to describe embodiments of the invention and are not intended to limit the invention in any way.

Example

Figure 4:
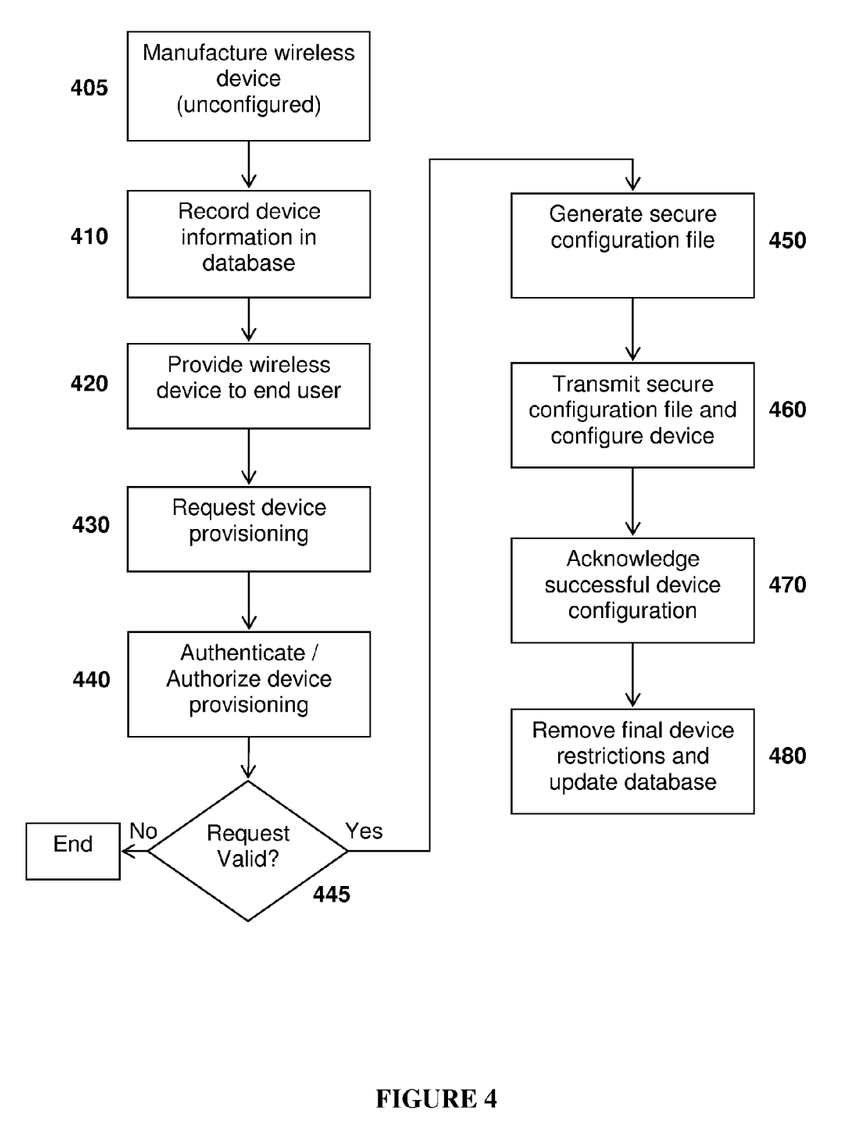
FIG. 4 illustrates a method for providing and provisioning a configurable wireless device in accordance with embodiments of the invention.

FIG. 4 illustrates a series of steps to be executed during manufacture and provisioning of a wireless device for use with a host system or host device, such as a personal computer, in accordance with embodiments of the present invention. These steps are directed toward a secure provisioning process which is directed toward inhibiting unauthorized provisioning or redistribution of provisioning information.

In step 405, the wireless device is provided, during manufacture, in a condition not initially usable for wireless communication, for example due to lack of configuration regarding one or more proprietary technologies, or otherwise being rendered unusable, as described above. For example, each wireless device may include general-purpose processors and other components which are unconfigured at the time of manufacture insofar as they are not subject to one or more licenses. For example, such wireless devices may be unconfigured at this stage concerning key essential pieces of technology relating to wireless wide-area networking standards. They can therefore be manufactured substantially royalty-free in one or more respects, thereby lowering costs.

Also during manufacture of the wireless device, in step 410, information regarding the device is recorded and uploaded to a database. The information includes a unique identifier for the wireless device, which is also recorded in the wireless device itself, possibly in an encoded or encrypted form. For example, FIG. 3 illustrates potential information that may be uploaded to the database in step 410 according to embodiments of the present invention.

In step 420, the wireless device is packaged together with software for installation on the host computer system, and supplied through distribution and sales channels to an end user. The software includes a program executable on the host system to facilitate configuration of the wireless device.

The first time the wireless device is accessed by an end-user, the host system, configured by the installed software, connects to a server and requests information, in step 430, that will enable the wireless device to be programmed and configured, for example, as a wireless data modem. In some embodiments, the request may specify the desired protocol for which the wireless device is to be configured. In some embodiments, the request may also specify additional information such as which wireless service provider is to be used, user account information, service level preferences, and the like. The user may be asked for final authorization to allow the host to initiate contact with the server. This request is passed over a secure channel and contains data indicative of a unique identifier matching that uploaded to the database in step 410. In one embodiment, the software may use HTTP headers to pass the required information for identification and generation of the signed embedded software image.

In one embodiment, a one-way hashing or fingerprinting algorithm operating on the host system, server or both, may be used as an additional measure to ensure that the requestor is genuine and has access to all the required information such as hardware chip ID and wireless device serial number. The one-way hashing algorithm cryptographically generates a code based on wireless device-specific information such as hardware chip ID, wireless device serial number, vendor ID, or a combination thereof. The algorithm generates codes in such a way that it is difficult to determine a reverse to the process, for example by finding a wireless device-specific information string that hashes to a given value, or by finding two separate strings that hash to the same value. Embodiments of the present invention use such a hashing algorithm to make it more difficult to illicitly obtain configuration software or configure wireless devices.

In step 440, the server examines the unique identifier, authenticates the wireless device, and authorizes information to be downloaded for configuration of the wireless device. Authorization for certain downloads may depend on the wireless device request and wireless device identifier. In other words, the server determines if the unique identifier is valid and if the wireless device is allowed to make the request. The server may also be configured to recalculate the one-way hash value using information residing in the database. The hash value sent by the software on the host system may be compared with the hash value calculated at the server to determine if they match. This serves as an authentication activity. The server may also check whether there are any errors in other information sent by the software.

If the request is validated and authorized 445, the server generates a secure configuration file to be transmitted to the host system in step 450. To facilitate security, a certificate is generated containing secured, authenticated information generated based on the wireless device information and an encryption key shared between the server and software of the host system. For example, the certificate can depend on information stored in the database, such as the hardware chip ID, the hash value generated by the server, or both. The certificate and software containing instructions for configuring the wireless device as desired are packaged in the secure configuration file. The configuration file includes configuration instructions which are specific to the selected service provider, for configuring the wireless device therefor in a requested manner. The host system is then notified that the configuration file is available for download.

In step 460, the configuration file is returned to the host system over a secure channel. The host system then installs a configuration file onto the wireless device, the file including an embedded software or firmware image. The configuration file and embedded software or firmware image may be used to configure the wireless device for operation using instructions in the configuration file, with restrictions imposed to ensure that the wireless device cannot yet be used for general access.

In step 470, the host system informs the server that step 460 is complete. This indicates that the wireless device now contains enabling technologies which requires royalty payments to be made.

In step 480, once the server acknowledges receipt of the message in step 470, the host system enables the wireless device to be used as a wireless data modem. Restrictions imposed in step 460 are removed and the wireless device can be used for network access as per an agreement with the wireless service provider. The server updates a database to reflect that the configuration has been completed. Indications of the configuration transaction can be recorded, reported to licensors of the enabling technologies, or both.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a semiconductor memory, gate array, quantum interference device, magnetic or optical crystal, tape or disc, or the like, for storing signals readable by a machine, for controlling the operation of a computer and/or firmware according to the method of the invention and/or to structure its components in accordance with the system of the invention.

It will further be appreciated that portions of the present invention, for example networked servers, databases, and systems of computing devices providing the functionality thereof, may be distributed in nature. For example, virtualized resources and geographically distributed computing devices may be used to provide embodiments of the present invention. Nevertheless, embodiments of the present invention provide systems or associated methods which are pertinent in one or more geographic regions, and in this sense may be considered to be provided within said regions, for example through a combination of one or more device and/or user interfaces. In some embodiments, a system or method may be considered to be provided in a geographic region if it is substantially controllable from within said region or if it is operable to benefit a user within said region.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C, assembler, C++, Java, P1/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A system for facilitating and monitoring provisioning of configurable wireless devices, the system comprising:
 a. a provisioning module configured to execute on a first server to:
  receive a provisioning request for a wireless device,
  facilitate a provisioning of the wireless device for operation with a wireless service provider in response to the provisioning request, and
  transmit an unlocking criterion to the wireless device, wherein the unlocking criterion enables at least one technology configured on the wireless device in a locked state;
 b. a monitoring module configured to execute on one of the first server and a second server to generate information in response to said provisioning, said information including an indication of an identity of a party providing said at least one technology of the wireless device; and
 c. a reporting module configured to execute on one of the first server and the second server to make available at least a first portion of said information generated by the monitoring module to the party providing said at least one technology of the wireless device.

2. The system of claim 1, wherein the provisioning request comprises transmission of a unique identifier of the wireless device to the provisioning module, and wherein the monitoring module generates information based at least in part on the unique identifier.

3. The system of claim 1, wherein the provisioning request comprises transmission of a unique identifier of the wireless device to the provisioning module, and wherein the provisioning module is further configured to facilitate said provisioning subject to validation of the unique identifier.

4. The system of claim 3, wherein validation of the unique identifier comprises determining whether the unique identifier is contained in a list of unique identifiers for which the requested provisioning is authorized.

5. The system of claim 1, wherein the provisioning request comprises transmission of a unique identifier of the wireless device to the provisioning module, and wherein the unique identifier is involved in at least one transaction with a database accessible by at least the provisioning module.

6. The system of claim 5, wherein the database is further accessible via the monitoring module, and wherein generating information by the monitoring module includes generating information by querying the database.

7. The system of claim 1, wherein the party providing said at least one technology of the wireless device is one of: a manufacturer of hardware incorporated in the wireless device, a licensor of technology incorporated in the wireless device, and a distributor of the wireless device.

8. The system of claim 1, wherein the reporting module is further configured to make available at least a second portion of said information generated by the monitoring module to a second party.

9. The system of claim 8, wherein the system is administered by an agreement provider for facilitating a revenue agreement between at least the party providing said at least one technology of the wireless device and the second party.

10. The system of claim 8, wherein the first portion of information and the second portion of information are used to facilitate triggering of a payment between the party providing said at least one technology of the wireless device and the second party.

11. The system of claim 8, wherein the second party is the wireless service provider.

12. The system of claim 8, wherein the second party provides the at least one technology of the wireless device.

13. The system of claim 1, wherein the provisioning module of the wireless device is further configured to provide a set of instructions for configuring the wireless device to operate in accordance with one or more wireless protocols.

14. The system of claim 13, wherein the set of instructions is digitally restricted so as to be operable only with the wireless device for which provisioning is requested.

15. The system of claim 1, wherein provisioning of the wireless device includes configuring one or more general-purpose digital or analog components of the wireless device.

16. The system of claim 1, wherein a host device is operatively coupled to the wireless device, the host device operable to facilitate provisioning of the wireless device.

17. The system of claim 1, wherein information generated by the monitoring module further includes one or more indications selected from the group comprising: indication of identity of the wireless service provider, indication of technology for which the wireless device is provisioned, indication of time or date of provisioning, indication of account information between the wireless device and the wireless service provider, indication of service level preferences associated with the wireless device, indication of number of times the wireless device has previously been provisioned, and indication of identities of one or more further parties providing enabling technology of the wireless device.

18. The system of claim 1, wherein the reporting module generates reports periodically or interactively.

19. The system of claim 1, wherein the reporting module is configured to make portions of information available to an authorized party based on a predetermined authorization profile associated with the authorized party.

20. A method for facilitating and monitoring provisioning of configurable wireless devices, the method comprising the steps of:

a. receiving, at a provisioning module executing on a first server, a provisioning request for a wireless device, wherein the wireless device is operatively connected to a network and the provisioning request is transmitted to the provisioning module via the network;

b. transmitting an unlocking criterion from the provisioning module to the wireless device via the network to facilitate provisioning of the wireless device for operation with a wireless service provider in response to the provisioning request, said unlocking criterion enabling operation of at least one technology of the wireless device, wherein the at least one technology is pre-configured on the wireless device in a locked state;

c. executing a monitoring module on one of the first server and a second server to monitor said provisioning, said monitoring including generating information in response to said provisioning, said information including an indication of an identity of a party providing the at least one technology of the wireless device; and d. making available, on one of the first server and the second server, at least a first portion of said generated information to the party providing the at least one technology of the wireless device.

21. The method of claim 20, wherein the provisioning request comprises transmission of a unique identifier of the wireless device to the provisioning module, and wherein said information generated in response to said provisioning is based at least in part on the unique identifier.

22. The method of claim 20, wherein the provisioning request comprises transmission of a unique identifier of the wireless device to the provisioning module, and wherein facilitating the provisioning is performed subject to validation of the unique identifier.

23. The method of claim 22, wherein validation of the unique identifier comprises determining whether the unique identifier is contained in a list of unique identifiers for which the requested provisioning is authorized.

24. The method of claim 20, wherein the party providing the at least one technology of the wireless device is one of a manufacturer of hardware incorporated in the wireless device, a licensor of technology incorporated in the wireless device, and a distributor of the wireless device.

25. The method of claim 20, further comprising the step of: making available, on of the first server and the second server, at least a second portion of said generated information to a second party.

26. The method of claim 25, wherein the provisioning module and the monitoring module are provided by an agreement provider for facilitating a revenue agreement between at least the party providing said at least one technology of the wireless device and the second party.

27. The method of claim 25, further comprising the step of triggering a payment be the party providing said at least one technology of the wireless device and the second party as a function of the first portion of said generated information and the second portion of said generated information.

28. The method of claim 25, wherein the second party is the wireless service provider.

29. The method of claim 25, therein the second party is the party providing the at least one technology of the wireless device.

30. The method of claim 20, wherein the provisioning of the wireless device further comprises the step of providing a set of instructions from the provisioning module to the wireless device via the network, wherein the set of instructions configure the wireless device to operate in accordance with one or more wireless protocols.

31. The method of claim 30, wherein the set of instructions is digitally restricted so as to be operable only with the wireless device for which provisioning is requested.

32. The method of claim 20, wherein the provisioning of the wireless device includes configuring one or more general-purpose digital or analog components of the wireless device.

33. The method of claim 20, wherein a host device is operatively coupled to the wireless device, the host device operable to facilitate provisioning of the wireless device.

34. The method of claim 20, wherein information generated in response to the provisioning further includes one or more indications selected from the group comprising: indication of identity of the wireless service provider, indication of technology for which the wireless device is provisioned, indication of time or date of provisioning, indication of account information between the wireless device and the wireless service provider, indication of service level preferences associated with the wireless device, indication of number of times the wireless device has previously been provisioned, and indication of identities of one or more further parties providing enabling technology of the wireless device.

35. The method of claim 20, wherein generated information is made available periodically or interactively.

36. The method of claim 20, wherein generated information is made available to an authorized party based on a predetermined authorization profile associated with the authorized party.

37. The system of claim 1, wherein the party providing said at least one technology of the wireless device is a manufacturer of the wireless device or a licensor of the at least one technology, and wherein the first portion of said information is used to facilitate triggering of a royalty payment from the manufacturer of the wireless device to the licensor of the at least one technology.

38. The method of claim 20, wherein the party providing said at least one technology of the wireless device is a manufacturer of the wireless device or a licensor of the at least one technology, and wherein the first portion of said generated information is used to facilitate triggering of a royalty payment from the manufacturer of the wireless device to the licensor of the at least one technology.

* * * * *

UNITED STATES PATENT AND TRADEMARK OFFICE
CERTIFICATE OF CORRECTION

PATENT NO.      : 8,645,002 B2                          Page 1 of 1
APPLICATION NO. : 12/498022
DATED           : February 4, 2014
INVENTOR(S)     : Gray et al.

It is certified that error appears in the above-identified patent and that said Letters Patent is hereby corrected as shown below:

IN THE CLAIMS

| | |
|---|---|
| CLAIM 1<br>Col. 19, Line 43 | Replace "configured" with "pre-configured" |
| CLAIM 24<br>Col. 21, Line 40 | Add a ":" after "one of" |
| CLAIM 25<br>Col. 21, Line 45 | Add "one" after "on" |
| CLAIM 29<br>Col. 22, Line 5 | Replace "therein" with "wherein" |

Signed and Sealed this
Fifteenth Day of April, 2014

Michelle K. Lee
*Deputy Director of the United States Patent and Trademark Office*